United States Patent
Boustingorry et al.

(10) Patent No.: US 9,828,291 B2
(45) Date of Patent: Nov. 28, 2017

(54) FLUIDIZING COMPOSITION TAKING THE FORM OF A POWDER AND ITS PREPARATION PROCESS

(71) Applicant: KERNEOS, Puteaux (FR)

(72) Inventors: Pascal Boustingorry, Breuillet (FR); Philippe Maitrasse, Checy (FR); Jean-Noel Bousseau, Loyettes (FR); Pascal Taquet, Grenay (FR); Jacques Estival, Bourgoin (FR)

(73) Assignee: KERNEOS, Puteaux (FR)

( * ) Notice: Subject to any disclaimer, the term of this patent is extended or adjusted under 35 U.S.C. 154(b) by 0 days.

(21) Appl. No.: 15/034,237

(22) PCT Filed: Nov. 7, 2014

(86) PCT No.: PCT/FR2014/052865
§ 371 (c)(1),
(2) Date: May 4, 2016

(87) PCT Pub. No.: WO2015/067911
PCT Pub. Date: May 14, 2015

(65) Prior Publication Data
US 2016/0280601 A1    Sep. 29, 2016

(30) Foreign Application Priority Data

Nov. 7, 2013 (FR) ..................... 13 60919

(51) Int. Cl.
| | | |
|---|---|---|
| *C04B 28/04* | (2006.01) | |
| *C04B 28/06* | (2006.01) | |
| *C04B 28/14* | (2006.01) | |
| *C04B 40/00* | (2006.01) | |
| *C04B 24/28* | (2006.01) | |
| *C08L 71/00* | (2006.01) | |
| *C04B 103/32* | (2006.01) | |
| *C04B 111/00* | (2006.01) | |
| *C04B 111/62* | (2006.01) | |

(52) U.S. Cl.
CPC ............ *C04B 24/286* (2013.01); *C04B 28/04* (2013.01); *C04B 28/06* (2013.01); *C04B 28/14* (2013.01); *C04B 40/0039* (2013.01); *C08L 71/00* (2013.01); *C04B 2103/32* (2013.01); *C04B 2111/00146* (2013.01); *C04B 2111/62* (2013.01)

(58) Field of Classification Search
CPC ... C04B 24/286; C04B 28/06; C04B 2111/62; C04B 28/04; C04B 28/14; C04B 40/0039; C04B 24/20; C04B 24/2658; C04B 7/02; C04B 7/32; C04B 14/06; C04B 14/28; C04B 24/2623; C04B 24/383; C04B 2103/32; C04B 2111/00146; C08L 171/00
USPC .......................................................... 524/2
See application file for complete search history.

(56) References Cited

U.S. PATENT DOCUMENTS

| | | | |
|---|---|---|---|
| 6,545,067 B1 | 4/2003 | Buchner et al. | |
| 2006/0172916 A1 | 8/2006 | Hidalgo et al. | |
| 2006/0281886 A1* | 12/2006 | Bichler | ............... C04B 24/2647 526/317.1 |
| 2010/0305238 A1* | 12/2010 | Hampel | .............. C04B 24/2647 524/2 |
| 2011/0160349 A1* | 6/2011 | Frunz | .................. C04B 24/2647 524/4 |
| 2013/0122299 A1* | 5/2013 | Rand | ....................... C08F 20/08 428/402 |
| 2013/0330532 A1* | 12/2013 | Dierschke | ........... C04B 24/2617 428/220 |
| 2014/0311387 A1* | 10/2014 | Hohn | ..................... C04B 28/02 106/805 |

FOREIGN PATENT DOCUMENTS

| | | | |
|---|---|---|---|
| DE | 19543304 A1 * | 5/1997 | |
| FR | 2 776 285 A1 | 9/1999 | |
| FR | 2 851 937 A1 | 9/2004 | |

OTHER PUBLICATIONS

Hanehara et al., "Interaction between cement and chemical admixture from the point of cement hydration, absorption behaviour of admixture, and paste rheology," Cement and Concrete Research 29 (1999) 1159-1165.*
Qiu et al., "Effect of Side Chains and Sulfonic Groups on the Performance of Polycarboxylate-Type Superplasticizers in Concentrated Cement Suspensions," Journal of Dispersion Science and Technology, 32:203-212, 2011.*
International Search Report, dated Mar. 10, 2015, from corresponding PCT Application.

* cited by examiner

*Primary Examiner* — William Phillip Fletcher, III
(74) *Attorney, Agent, or Firm* — Young & Thompson

(57) ABSTRACT

A fluidizing composition in the form of a liquid or in the form of a powder including at least one superplasticizer chosen from polycarboxylate ethers, characterized in that it includes from 1 to 20 parts by weight of at least one aromatic hydrocarbon sulfonic acid or one of its salts chosen from alkali salts, alkaline-earth salts or one of their mixtures, for 100 parts by weight of the superplasticizer. A method for preparing such fluidizing composition, a dry mortar incorporating the fluidizing composition, as well as plasters prepared from the dry mortar are also described.

20 Claims, 3 Drawing Sheets

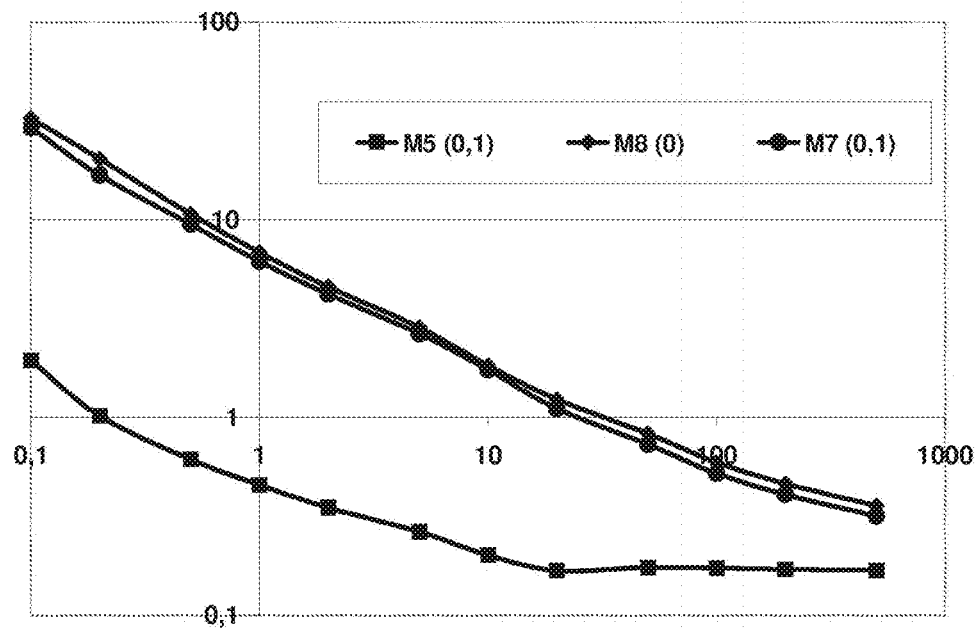

FLUIDIZING COMPOSITION TAKING THE FORM OF A POWDER AND ITS PREPARATION PROCESS

FIELD OF THE INVENTION

The present invention relates to a fluidizing composition in the form of a liquid or a powder, a method for preparing such fluidizing composition, a dry mortar and a concrete incorporating said fluidizing composition, as well as coatings prepared from said dry mortar or said concrete, such as plasters and floor coatings.

STATE OF THE ART

Use and performances of materials comprising hydraulic binders have been improved by adding polymeric superplasticizers to their formulations. The function of the latter is to ensure that the starting suspension has been given a maximum fluidity with a minimum water content so as to make it easy to process, while preventing any detrimental impact of a water excess on the stability on the fresh state, on the durability and on the performances thereof once hardened.

Polycarboxylate ethers revealed to be components particularly efficient as superplasticizers. This new generation of copolymers is based on poly(alkylene oxide) chains grafted onto a polycarboxylic acid chain. Such products have an easy-to-control formula and are well known for their dispersing properties. They are negatively charged because of the presence of carboxylate groups, whereby they are able to adsorb on hydraulic binder particles and to effect an electrostatic repulsion, while the poly(alkylene oxide) grafts, which do not adsorb, cause a "steric repulsion".

These compounds can be used in concrete formulations, as well as in self-leveling plaster formulations.

It is known in the prior art from U.S. Pat. No. 6,545,067 which describes a plasticizer mixture intended to reduce the proportion of air pores in a cement-containing building material when the plasticizer is based on polycarboxylates. In particular, the plasticizer mixture comprises a fluidizing agent based on polycarboxylates and at least one air detrainer, such as butoxylated polyalkylenepolyamines or salts thereof.

However this document does not give any indication to optimize the fluidity of self-leveling mortars.

As used herein, a "self-leveling plaster" is intended to mean a fluid mortar which enables to obtain, after an application or a casting process on a horizontal substrate (floor), a surface that is free from unevenness and perfectly plane without any surface mechanical treatment (such as sanding for example).

Thanks to their high processability, such plasters are widely used for rectifying the level unevenness between the building raw plates or horizontal surfaces of any nature, onto which finish coatings are thereafter applied, such as laminated floors, tiled floors, plastic tiles or coatings or carpets.

On extensive building sites, self-leveling plasters are generally implemented by means of mixing machines, then pumped. Such machines have specificities as regards mortar mixing with water.

Powdered mortar and water are introduced into the machine, and mixing is effected by means of an endless screw. The mixing time is very short, of about a few seconds, and the shearing energy is low, as compared to a mixing which would be effected by a stirring device with a high rotation speed.

Once the mixing is completed, the fresh mortar is pumped to be transported, via a flexible hose, to its deposition site. It is then easy to spread because of its self-leveling character and does only need a small manual intervention with a spatula, a picker roller or others.

An excessively fast mixing of powdered mortar/water in the machine may result in the production of a mix of poor quality, due to the bad dispersion of mortar. In such an event, the viscosity of fresh mortar entering the pump will be too high and will cause an increase in pressure and an unintentional flow rate decrease, and thus a decreased productivity. In addition, a bad dispersion leads to a heterogeneous mortar with defects. In an attempt to counter such a situation, the applicator will typically try to increase the rate of water, causing the performances to deteriorate: settling and bleeding, loss of mechanical properties.

Facing such a situation, there are two options, either increase the mixing time, which is detrimental to productivity, or improve mortar dispersion rate.

To increase mortar wetting/dispersion rate in water implies being able to improve the efficiency of the fluidizing agent (superplasticizer), polycarboxylate ether in this case. Further, when a mixing time of about a few seconds is mentioned, the use of traditional polycarboxylate ethers does not enable to obtain satisfactory performances.

Therefore, there is a real need to develop a new fluidizing agent, which would make it possible inter alia to better control the rheology of compositions comprising a hydraulic binder (Portland cement, high-alumina cement, etc.), such as mortar-based compositions (self-leveling plaster) or concrete.

BRIEF DESCRIPTION OF THE DRAWINGS

The invention will be further illustrated, without being limited in any way, by the following description of a particular embodiment, given only by way of example and shown in the appended drawings in which:

FIG. 5 illustrates curves showing the viscosity variations (Pa.s) as a function of the shear gradient ($s^{-1}$).

DETAILED DESCRIPTION OF THE INVENTION

Figure 1:
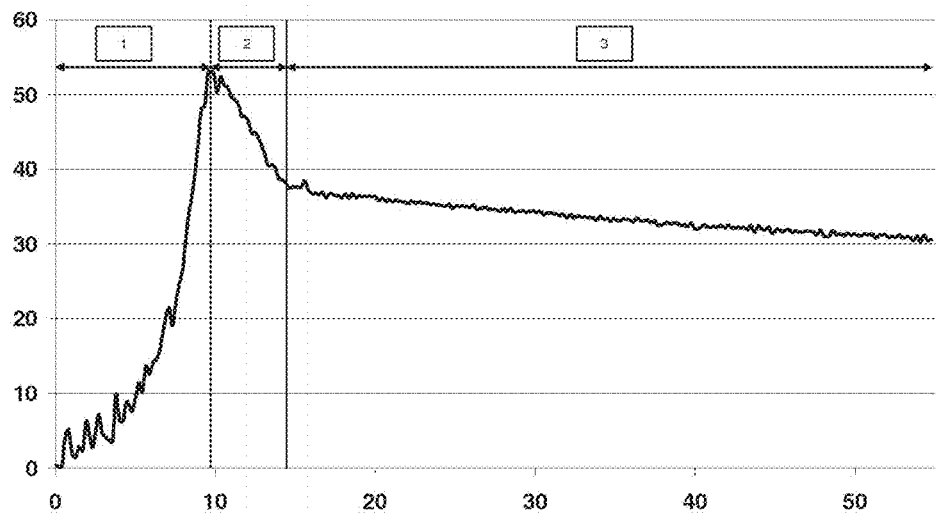
FIG. 1 illustrates the strain evolution (in arbitrary unit) as a function of time (in seconds)

It is thus an object of the present invention to provide a new fluidizing composition, which would be able to avoid all or part of the abovementioned drawbacks.

To that end, the present invention as an object provides a fluidizing composition comprising, at least:

one superplasticizer chosen from polycarboxylate ethers, and 1 to 20 parts by weight, preferably 2 to 10 and in particular 3 to 7 parts by (dry) weight, of at least one aromatic hydrocarbon sulfonic acid or one of its salts chosen from alkali salts, alkaline-earth salts or one of their mixtures, for 100 parts by (dry) weight of superplasticizer.

As used herein, a range from 1 to 20 is intended to include the values 3; 3.5; 4; 4.5; 5; 5.5; 6; 6.5; 7; 7.5; 8; 8.5; 9; 9.5; 10; 10.5; 11; 11.5; 12; 12.5; 13; 13.5; 14; 14.5; 15; 15.5; 16; 16.5; 17; 17.5; 18; 18.5; 19; 19.5, or 20.

In particular, the fluidizing composition comprises from 3 (not included) to 7 parts by weight of said at least one aromatic hydrocarbon sulfonic acid or one of its salts chosen from alkali salts, alkaline-earth salts or one of their mixtures, for 100 parts (dry) by weight of superplasticizer. Indeed the applicant surprisingly discovered that using a fluidizing composition comprising: at least one superplasticizer of the polycarboxylate ether type and at least one aromatic hydrocarbon sulfonic acid or one of its salts, enables to significantly improve the action kinetics of said superplasticizer.

As used herein, improving the action kinetics of a superplasticizer or a fluidizing composition is intended to mean improving:
the dispersion rate of mortar-based or concrete-based formulations incorporating the fluidizing composition,
the rate required to obtain the target viscosity of fresh mortar or of concrete, and thereafter its stability.

Moreover, quite unexpectedly, the fluidizing compositions of the invention enable to achieve the expected performances by using lower polycarboxylate ether proportions by weight as compared to mortar total weight.

The fluidizing compositions of the invention come either in a liquid form, or as powders. Generally, the liquid form is suitable for preparing concrete compositions, while the powder form will be generally suitably used for preparing ready-to-use mortar formulations de mortars, such as self-leveling plasters.

Unless otherwise specified, values mentioned as ranging from "X to Y" as used herein are intended to include values X and Y.

As previously indicated, the fluidizing composition comprises at least one aromatic hydrocarbon sulfonic acid or one of its salts.

As used herein, "one of its salts" is intended to mean a salt chosen from alkali salts, alkaline-earth salts or one of their mixtures.

As used herein, an "aromatic hydrocarbon" is intended to mean an organic compound, that is to say a compound which essentially contains carbon and hydrogen atoms, amongst which at least one fragment satisfies Hückel's aromaticity rule. An aromatic hydrocarbon may for example contain a benzene ring.

The aromatic hydrocarbon sulfonic acid in the fluidizing composition according to the present invention thus comprises an aromatic hydrocarbon substituted by at least one sulfonic group.

It may be chosen for example from: benzenesulfonic acid, p-phenolsulfonic acid, cresolsulfonic acid, o-cresolsulfonic acid, m-cresolsulfonic acid, para-toluenesulfonic acid, 2,4-xylenesulfonic acid, 2,5-xylenesulfonic acid, dodecyl-benzenesulfonic acid, alkyldiphenyloxide disulfonic acids, or one of their salts chosen for example from alkali salts and alkaline-earth salts, or one of their mixtures. Preferably, sodium or potassium salts will be selected, or combinations thereof.

The aromatic hydrocarbon sulfonic acid is advantageously para-toluene sulfonic acid or one of its salts, such as its sodium salt.

Unexpectedly and as illustrated in the following examples hereafter, it has been discovered that the aromatic hydrocarbon sulfonic acid according to the present invention would make it possible to improve the properties of the superplasticizer based on polycarboxylate ethers.

According to the present invention, polycarboxylate ethers may be chosen from: statistical copolymers, alternating copolymers, block copolymers or copolymers with a comb structure comprising at least one oxyalkylene glycol-containing structural unit and at least one carboxylic acid unit.

Preferably polyalkylene glycol polycarboxylates will be used, which the main chain comprises carboxyl groups and the one or more side chain(s) comprise(s) oxyalkylene glycol groups.

These polymers may be present either in a free acid form or in the form of salts thereof.

To be mentioned as suitable carboxylic acids or unsaturated carboxylic acid derivatives to use are especially: acrylic acid, methacrylic acid, maleic acid anhydride, maleic acid, fumaric acid, itaconic acid, as well as itaconic acid anhydride.

Polycarboxylate ethers may be linear, branched and have a comb-like structure, a star-like structure or others.

Preferably polycarboxylate ethers are chosen from: copolymers of carboxylic acids and poly(alkylene glycol) carboxylic ester, copolymers of carboxylic acids and poly(alkylene glycol) amide, copolymers of carboxylic acids and poly(alkylene glycol) imide, copolymers of carboxylic acids and poly(alkylene glycol) vinylethers, copolymers of carboxylic acids and poly(alkylene glycol)(meth)allyl ethers, copolymers of carboxylic acids and poly(alkylene glycol) isoprenol ethers, neutralized or not, and/or their combinations. These copolymers may also carry other chemical moieties, such as amide, sulfonate group(s), etc.

Polycarboxylate ethers that can be suitably used in the present invention preferably have a grafting rate lower than or equal to 25%, in particular lower than or equal to 20%, typically lower than or equal to 15% and most suitably lower than or equal to 10%.

As used herein, the "grafting rate" is intended to mean the ratio between the number of polyalkylene glycol grafts, and the addition of the total number of carboxyl and/or carboxylate moieties and the number of polyalkylene glycol grafts.

Typically, the fluidizing composition comprises at least 40%, preferably at least 80% and more preferably at least 90% by weight of superplasticizer as compared to the dry fluidizing composition total weight.

Preferably, the fluidizing composition in the form of a powder of the invention has a particle size lower than or equal to 315 µm.

The fluidizing composition based on at least one superplasticizer according to the present invention may comprise moreover one or more additive(s). As used herein, the "additives for the fluidizing composition" are intended to mean additives, which can be added to this composition other than aromatic hydrocarbon sulfonic acids or their salts.

Advantageously, the fluidizing composition in the form of a powder comprises at least one anti-caking agent.

According to the present invention, anti-caking agents may be chosen from: precipitated silicas, pyrogenated silicas, kaolins, clays, calcium carbonate, or one of their mixtures.

Other additives may also be used. An anti-foaming agent or a thickening agent are also to be mentioned, in a non-exhaustive manner.

The present invention further relates to a method for preparing a fluidizing composition such as defined hereabove comprising a step for mixing together at least one superplasticizer chosen from a polycarboxylate ether and at least one aromatic hydrocarbon sulfonic acid or one of its salts, said at least one aromatic hydrocarbon sulfonic acid or one of its salts representing, for 100 parts by weight of said superplasticizer, from 1 to 20 parts by weight (dry weights).

In one embodiment, the fluidizing composition such as described hereabove presents in a liquid form and may be prepared by mixing together at least one polycarboxylate ether and at least one aromatic hydrocarbon sulfonic acid in a solvent, such as water (method 1).

In this embodiment, polycarboxylate ether advantageously comes already as a solution to which is added:

either the aromatic hydrocarbon sulfonic acid in the form of a powder, the mixture being, after complete dissolution, neutralized through the addition of a base, preferably sodium hydroxide, or its sodium salt, or the aromatic hydrocarbon sulfonic acid in a solution, which has been beforehand neutralized by a base, preferably sodium hydroxide, or its sodium salt.

After the neutralization step through the addition of a base, the above mixture preferably has a pH value lower than or equal to 8, in particular a pH value lower than or equal to 7, typically ranging from 5.5 to 7 (inclusive) and most suitably of 6.5.

In another embodiment, the fluidizing composition such as described hereabove comes in the form of a powder (method 2).

It may be prepared by mixing a powder of polycarboxylate ether together with a powder of aromatic hydrocarbon sulfonic acid or one of its salts. In such an event, a polycarboxylate ether is preferably used, which is already in the form of a powder, having in general a particle size lower than or equal to 315 μm, and an aromatic hydrocarbon sulfonic acid, also in the form of a powder.

The fluidizing composition in the form of a powder may also be prepared by means of a preparation method comprising the following steps:

a) a step for mixing together at least one superplasticizer chosen from a polycarboxylate ether and at least one aromatic hydrocarbon sulfonic acid or one of its salts, in liquid forms;

b) a step for drying the mixture obtained in step a).

The liquid mixture of step a) is obtained according to the procedure described hereabove (method 1).

The drying step b) may be carried out by any technology known from the person skilled in the art, especially by co-atomization or deposition onto a substrate.

Co-atomization consists in spraying the fluidizing composition in a liquid form in an atomizer within which a hot air flow enables to transform the liquid fluidizing composition to powder.

The anti-caking agent (fine silica), when present, may be concurrently introduced into the atomizing chamber, or may be added to the dried powder, through mixing. The amount of anti-caking agent by weight is preferably lower than or equal to 5%, typically it does range from 2 to 4% as compared to the fluidizing composition total weight in a powdered form.

The deposition onto a substrate is effected by absorption of the mixture in solution, preferably onto a mineral adsorption substrate with a high specific surface, for example a specific surface higher than or equal to 100 m$^2$/g. Generally, the high specific surface mineral adsorption substrate is a high specific surface silica, such as a precipitated silica or a pyrogenated silica.

The deposition onto a substrate, followed with the drying, is carried out in a chamber under vacuum at a temperature of about 80° C.

The other optional additives (anti-foaming agent, thickening agent) may be incorporated, either into the solution, prior to drying, or through a powder/powder mixing operation.

The drying step b) enables to obtain a powder with a residual moisture content generally lower than or equal to 3%, or even lower than or equal to 2% by weight, as compared to the composition total weight.

When the fluidizing composition is obtained by co-atomization, it preferably comprises, by weight, as compared to said composition total weight:

from 70 to 95%, preferably from 80 to 95% of polycarboxylate ether, from 0.7 to 19%, preferably from 2 to 10% of aromatic hydrocarbon sulfonic acid or one of its salts, from 0 to 5%, preferably from 2 to 4% of an anti-caking agent.

When the fluidizing composition is obtained by drying it through deposition onto a substrate, it preferably comprises, by weight, as compared to said composition total weight:

from 35 to 55%, preferably from 40 to 50% of polycarboxylate ether, from 0.35 to 11%, preferably from 1 to 5% of aromatic hydrocarbon sulfonic acid or one of its salts, from 40 to 60% of a mineral adsorption substrate with a specific surface higher than or equal to 100 m$^2$/g.

The present invention further relates to a dry mortar comprising at least one hydraulic binder characterized in that it further comprises a fluidizing composition such as defined hereabove.

The dry mortar composition, by weight, as compared to said composition total weight, is as follows:

from 15 to 50%, preferably from 30 to 40% of a hydraulic binder, from 25 to 80%, preferably from 50 to 70% of mineral fillers, from 0.01 to 2%, preferably from 0.05 to 0.5% of the fluidizing composition, from 0 to 5% of other additives (accelerator, retarder, anti-foaming agent).

The hydraulic binder comprises preferably at least one high-alumina cement and/or one Portland cement and/or one or more calcium sulfates.

Said "high-alumina cement" is in general defined as a hydraulic binder which alumina content ranges from 30 to 80% by weight as compared to the binder total weight. To be mentioned as suitable high-alumina cement for use in the present invention, are the products of Ternal® and SECAR® ranges. The high-alumina cement may be under a crystallized mineralogical phase chosen from CA, $C_{12}A_7$ or under an amorphous phase, or in the form of a mixture of at least one of said crystallized mineralogical phases and one amorphous phase. The high-alumina cement has preferably a specific surface (Blaine) higher than or equal to 1500 cm$^2$/g, preferably ranging from 2000 to 5000 cm$^2$/g.

Portland cement may be especially a cement standardized according to the European Standard for cement EN 197-1.

Calcium sulfates may be in the form of anhydrite, gypsum or hemihydrate, of natural or synthetic origin.

Other hydraulic binders may also be used, such as for example, hydraulic lime or a sulfoaluminous cement.

In one advantageous embodiment of the invention, the hydraulic binder comprises by weight, as compared to the dry mortar total weight, a high-alumina cement, optionally a Portland cement and/or one or more calcium sulfates:

from 5 to 35%, preferably from 15 to 30%, more preferably from 15 to 25% of high-alumina cement, from 0 to 35%, preferably from 0 to 10%, more preferably from 0 to 5% of Portland cement, from 0 to 15%, preferably from 0 to 10%, more preferably from 5 to 10% of calcium sulfates.

In another advantageous embodiment of the invention, the hydraulic binder is essentially based on calcium sulfates. In such an event, the dry mortar comprises, by weight, as compared to the dry mortar total weight from 15 to 50%, preferably from 30 to 40% of calcium sulfates.

The mortar comprises fillers, preferably mineral fillers. These mineral fillers represent, by weight, from 25 to 80%, preferably from 50 to 70% of the dry mortar total weight. The mineral fillers are preferably chosen based on a particle size distribution ranging from 0 mm to 2 mm. They are chosen from siliceous compounds (sand, quartz) or from carbonaceous compounds (calcium carbonate, dolomite.). Mineral fillers thus comprise fines or fillers and sands. According to the present invention, fillers have a particle size ranging from 0 to 80 μm and sand has a particle size ranging from 0 to 2 mm, preferably from 0 to 800 μm. Fillers represent preferably from 10% to 40%, more preferably from 20 to 35% by weight and sand from 10% to 40%, more preferably from 20 to 40%, by weight, as compared to the dry mortar total weight.

The dry mortar of the invention generally comprises a plurality of additives. These are set controlling agents, rheology modifiers: thickening agents and water retentive agents, anti-foaming agents and co-binders in the form of redispersible resins.

The set controlling agents include accelerators and retarders. To be mentioned as accelerators are lithium sulfate, lithium carbonate or potassium sulfate. To be mentioned as retarders, are boric acid or carboxylic acids, especially citric, tartaric, gluconic acids as well as corresponding salts thereof. As a rheology modifier can be mentioned anti-settling agents such as welan and diutan gums, xanthan gum, guars, starches or clays. Cellulose ethers can be mentioned as suitable water retentive agents.

The additives to the dry mortar as a whole represent, by weight, from 0 to 5% as compared to the dry mortar total weight.

The present invention further relates to a self-leveling fluid mortar. In particular, the self-leveling fluid mortar is obtained through a mixing with water of the dry mortar such as defined hereabove.

The water/mortar weight ratio is lower than or equal to 0.5, preferably lower than or equal to 0.3 and more preferably lower than or equal to 0.25.

The preparation and implementation method of a self-leveling fluid mortar such as defined hereabove, onto a coating, is characterized in that it comprises:
a) the preparation of the fluid mortar by mixing together the dry mortar with water,
b) optionally, the pumping of the fluid mortar,
c) the application of the fluid mortar onto a surface of the coating to make even said surface onto which it is applied.

According to the present invention, the mixing step may be carried out in a mechanic mixer, with very short mixing times (few seconds).

The plaster once applied may have a thickness ranging from 3 mm to 10 cm. It may be:
a floor leveling plaster having a thickness from 3 to 5 cm, either intended to be covered or to remain bare,
a SLS (Self Leveling Screed) having a thickness from 3 to 10 cm.

A coating is thus obtained first through the application, then the drying of the self-leveling fluid mortar such as defined hereabove.

The present invention also relates to a concrete comprising at least one hydraulic binder, aggregates generally chosen from sand and gravels, water, characterized in that it further comprises a fluidizing composition such as defined hereabove.

The concrete composition by dry weight as compared to the dry total weight of said concrete composition, is as follows:
from 0.5 to 50%, preferably from 2 to 30% of a hydraulic binder,
from 0 to 50%, preferably from 0 to 30% of mineral fillers (fillers, sands),
from 10 to 98%, preferably from 20 to 95% of aggregates (amongst which from 1 to 99% of sands and from 1 to 99% of gravels and/or broken gravels have a particle size distribution higher than 2 mm, preferably ranging from 2 to 15 mm, preferably from 2 to 10 mm),
from 0.01 to 5%, preferably from 0.05 to 1.5% of the fluidizing composition,
from 0 to 5% of other additives (accelerator, retarder, anti-foaming agent, fibers, . . . ).

The components of concrete include those defined for dry mortar. They comprise in addition aggregates with a particle size higher than those used for mortars.

Indeed, as used herein, a "concrete" is intended to mean a combination of at least one hydraulic binder, aggregates, optionally additives and optionally mineral additions, together mixed with water.

As used herein, "aggregates" are intended to mean a group of mineral grains with a size lower than 125 mm: this in particular includes sands such as defined hereabove, broken gravels and gravel-sand mixtures such as defined in Standard EN12620 (2008).

The characteristics for ready-to-use concretes are especially detailed in Standard EN206-1 (2004) and for precast concretes in Standard EN13369 (2004).

Concrete is preferably obtained through mixing together with water the previously mentioned concrete composition in dry weight in proportions that are known from the person skilled in the art. In particular, concrete is prepared by blending and/or mixing together aggregates, mineral fillers, the hydraulic binder, optionally additives and the fluidizing composition according to the present invention, beforehand combined with water.

Lastly, it is an object of the present invention to provide the use of a fluidizing composition such as described hereabove as a superplasticizer in a composition comprising at least one hydraulic binder, such as concrete or dry or liquid mortar.

EXAMPLES

The examples hereunder are only given for illustrative purposes and are not considered to be limiting as the scope of the present invention. In the following examples, unless the unit is specified, the percentages are expressed in weight percent.

I. Fluidizing Compositions

1. Raw Materials Used

Two fluidizing compositions in a liquid form have been prepared: one according to the prior art (P1) as a comparison and one according to the invention (P2).

The first fluidizing composition P1 comprises a polycarboxylate ether (PCE) in aqueous solution. It has a pH value of 6.5 and a dry matter content of 35% by weight of PCE. The polycarboxylate ether that is used, which grafting rate is lower than 10%, has been obtained according to a method described in the patent FR2776285.

The second fluidizing composition P2 according to the present invention is prepared from the first fluidizing composition P1 to which is added a powder of an aromatic hydrocarbon sulfonic acid, which dissolves.

P2 comprises the following composition:

TABLE I

| Components | Amounts (g) | Extract (% w/w) | Dry matter (g) |
|---|---|---|---|
| Fluidizing composition P1 | 96.35 | 35.00 | 33.72 |
| Para-toluene sulfonic acid monohydrate (PTSA) | 1.67 | 90.50 | 1.51 |
| Soda 50% | 1.98 | 50.00 | 0.99 |
| Total | 100.00 | 35.8 | 35.78 |

Soda has been added so as to obtain a pH value corresponding to the composition P1, i.e. 6.5. The dry extract of the liquid fluidizing composition P2 represents 35.8% of PCE. PTSA percentage as compared to the liquid P2 dry matter is 4.22%.

2. Preparation of the Fluidizing Compositions as Powders

Fluidizing compositions P1 and P2 have thereafter been dried according to two different methods, i.e. through atomization or through deposition onto a substrate.

Three fluidizing compositions in a powdered form have been obtained from the liquid fluidizing compositions P1 and P2 previously described.

Method Through Atomization:

A fluidizing composition in a powdered form C2 is obtained according to the prior art by atomizing the liquid fluidizing composition P1. After production of a powder, 3% of silica aerosil® OX 50 (silica, BET=50 m²/g) marketed by Evonik Industries AG are incorporated through mixing as an anti-caking agent. In the end the fluidizing composition C2 in a powdered form is made of:

| Polycarboxylate ether polymer | 97.10% |
|---|---|
| Silica aerosil® OX 50 | 2.9% |

A first fluidizing composition in a powdered form C5 is obtained according to the present invention by atomizing the liquid fluidizing composition P2 (aqueous solution of the PCE-PTSA mixture). After production of a powder, 3% silica Aerosil® OX 50, as compared to the fluidizing composition C5 weight, are incorporated thereto.

In the end the fluidizing composition C5 in a powdered form is made of:

| Dry mixture PCE polymer - PTSA (4.05% PTSA monohydrate) | 97.10% |
|---|---|
| Silica aerosil® OX 50 | 2.9% |

Method Through Deposition onto a Substrate:

A second fluidizing composition in a powdered form C6 according to the present invention is obtained through deposition onto a substrate of the liquid fluidizing composition P2. Such deposition onto a substrate is effected by means of a powder blender of the ROTO P10® type fitted with a vacuum drying system. A silica substrate referred to as Tixosil® 38 (precipitated silica, BET=250 m²/g) marketed by Rhodia is incorporated into the mixer. The system is heated to 80° C., and pressure is regulated to 380 mBar. The mixer is then supplied with liquid fluidizing composition P2 to a flow rate adjusted so as to target in the end a proportion of 50% by weight of active materials as compared to C6 weight. At the end of the supply with fluidizing composition P2, drying is continued to target a residual moisture lower than 6% maximum in the thus obtained powder C6.

Initial amounts introduced into the mixer ROTO P10® are as follows:

| Tixosil® 38 | 790 g |
|---|---|
| P2 | 2210 g |

In the end, after deposition onto a substrate, the fluidizing composition C6 in a powdered form is made of:

| Dry mixture PCE polymer - PTSA (4.22% PTSA monohydrate) | 49.54% |
|---|---|
| Tixosil 38 | 49.48% |
| Waste water | 0.98% |

II. Tested Mortar Compositions (Products Used and Formulations of Dry Mortars)

The self-leveling mortar composition used to evaluate the various fluidizing compositions, according to the present invention and according to the prior art, is detailed in the following Table II:

TABLE II

| Mortar components | Function | Description | % |
|---|---|---|---|
| High-alumina cement | hydraulic binder | Ternal® RG | 20.00 |
| Portland cement | hydraulic binder | CEM I 52.5 N | 4 |
| Calcium sulfate semihydrate | hydraulic binder | Prestia creation | 7 |
| Calcium carbonate | Filler | Durcal® 2 | 16.52 |
| Calcium carbonate | Filler | Durcal® 40 | 17.37 |
| Siliceous sand | Filler (sand) | CV32 (SIBELCO) average particle size 280 µm | 25.57 |
| Siliceous sand | Filler sand | BR 36 (SIBELCO) average particle size 180 µm | to 100 |
| Ethylene vinyl acetate polymer | additive (redispersible resin) | Vinnapas 5011L | 3 |
| | additive (anti-foaming agent) | Dehydran 1933 | 0.10 |
| | additive (set controlling agent) | tartaric acid | 0.10 |
| Cellulose ether | additive (rheology modifier) | Tylose® H300P2 | 0.10 |
| | additive (set controlling agent) | lithium carbonate | 0.03 |
| Fluidizing composition (C2, C5 or C6) | superplasticizer | | see Table III |
| Total | — | | 100.00 |

The rates for the tested fluidizing compositions C2, C5 and C6, expressed in weight percentages as compared to mortar total weight, are as follows:
 fluidizing composition C2: 0.1%
 fluidizing composition C5: 0.1 and 0.07%
 fluidizing composition C6: 0.2 and 0.14% (49.54% of active materials).

References of mortars comprising the various fluidizing compositions are gathered in following Table III.

TABLE III

| Mortar Reference | Reference for fluidizing compositions incorporated to the plasters | Fluidizing composition amounts to incorporate (% on total formulae) | AM amount* (%) |
|---|---|---|---|
| M2(0.1) | C2 | 0.10 | 0.10 |
| M5 (0.1) | C5 | 0.10 | 0.10 |
| M5 (0.07) | C5 | 0.07 | 0.07 |
| M6 (0.2) | C6 | 0.20 | 0.10 |
| M6 (0.14) | C6 | 0.14 | 0.07 |

*AM: active material
To be mentioned as a reference, two other mortars have been tested:
Formulation "M7 (0.1)", with no fluidizing composition, but with addition of 0.1% PTSA monohydrate,
Formulation "M8 (0)", with no fluidizing composition.
These two mortars M7 and M8 therefore do not contain any PCE superplasticizer.

All the dry mortars are obtained by mixing raw materials as powders by means of a blender Turbula® ex WAB for a time period of 10 minutes.

III. Characterization Protocol

1. Self-Spreading Test for Liquid Mortars

Self-leveling mortars are obtained by mixing together with water the hereabove mentioned formulations (M2 (0.1), M5 (0.1), M5 (0.07), M6 (0.20) or M6 (0.14) (mixing rate 24 parts by weight).

For the tests in particular the mixing is effected in the following manner:
the mixing water is incorporated to a metallic beaker and added to the disperser Rayneri® turbotest fitted with an anker-like blade. The blending rate is of about 240 rotations per minute,
2 kg of dry mortar are added thereto, within 20 seconds. After incorporation of the powder, the mixture is stirred at 800 rotations per minute for 100 seconds.

The initial self-spreading is measured 2 minutes after the end of mixing using a ring with a size d=63 mm, h=35 mm.

Results are given in Table IV.

2. Evaluation of the Fluidization Kinetics: Method 1

The test consists in continuously measuring the evolution of the viscosity, at the very beginning of the mortar/water mixing. A rheometer Lamy Rheomat RM 260 is used, fitted with a 3-blade propeller. The test is effected in a 125 mL polypropylene flask.

Procedure:
pour 24 g of water into the flask,
dip in the rheometer mobile part until the propeller is fully immersed,
weigh 100 g of the mortar to be evaluated,
configure the rheometer (Measuring mode: viscosity=f (time), Gradient 500 s$^{-1}$,
mobile part selection MK DIN 145),
trigger the measuring process upon pouring powder into water,
collect measurement for a time period of 1 minute,
repeat the test 6 times,
select the consistent tests (regular incorporation of the powder; presence of only one regular peak),
work out the average of the selected curves,
draw the average curve strain=f (time) (strain is expressed in arbitrary unit).

A typical curve obtained with such evaluation protocol is shown on FIG. 1 which illustrates the strain evolution (in arbitrary unit) as a function of time (in seconds).

There are three distinct steps:

Step (1) corresponds to the wetting phase, that is to say to the production of a continuous phase between water and powder. During this phase, strain increases since it moves from the one of water to the one of wet mortar.

Step (2) corresponds to the dispersion phase (or deflocculation) of particles by the superplasticizer (PCE only or with PTSA depending on the tests). During this phase, strain decreases drastically and quickly until a virtually stable strain is obtained. The time required for this virtually stable strain to be achieved is therefore intrinsic to mortar fluidization kinetics and depends on the superplasticizer efficiency. This time will be considered as the reference to compare the fluidizing compositions according to the present invention and the fluidizing compositions according to the prior art.

Step 3 corresponds to the stabilization of the fresh mortar viscosity.

The various strain levels obtained are inversely proportional to the fluidizing efficiency of PCE.

The higher the peak height (strain), the stronger the energy to develop for mixing mortar and water together.

The higher the plateau strain (step 3), the more energy is needed to pump the fluid mortar.

3. Evaluation of the Fluidization Kinetics: Method 2

A second protocol has been implemented to measure the fluidization kinetics of the fluidizing compositions of the invention.

The self-leveling mortar is combined under "altered" mixing conditions according to the following protocol:
pour 24 g of water into a 125 mL polyethylene flask,
dip in the mixing blade of a blender IKA® until the surface of water comes up to the upper part of the propeller,
weigh 100 g of the mortars to be evaluated (M2 (0.1), M5 (0.1), M5 (0.07), M6 (0.20) or M6 (0.14)),
start up the blender IKA®, set the speed of rotation to 400 rpm,
incorporate within 5 seconds and for each test said 100 g of powder using a paper cone,
stop mixing at t=30 seconds,
repeat the tests with mixing times of 60, 90, 120 and 150 seconds.

For each test, measure with the various mixing time the viscosity as a function of the velocity gradient by means of the Rheomat® RM260 apparatus with following configuration:
mobile MK DIN 125.
pre-shearing at 50 s$^{-1}$ for 10 seconds,
thereafter step by step exploration with following velocity gradients: 10, 20, 50, 100 and 200 s$^{-1}$ for 30 s per gradient (10 measuring points per gradient),
record strain values as a function of velocity gradient.

The retained strain values to measure the evolution of rheology as a function of the various mixing times, are those measured at 100 s$^{-1}$.

The measurement accuracy is +/− 30 Pa.

The strain values observed according to this protocol are higher than those corresponding to method 1 due to differences in the velocity gradient and in mobile geometries.

IV. Results

1. Self-Spreading

The values in diameters for the spreading of the various self-leveling mortars are given in the Table hereafter.

As a reminder, the fluidizing compositions of the present invention are referred to as C5 and C6, the fluidizing composition C5 being obtained through co-atomization and the fluidizing composition C6 being obtained through deposition onto a substrate. The content in active materials in C6 is of about 50%.

TABLE IV

| Mortar References | Fluidizing composition references | Rates (weight %/dry mortar) | Self-spreading t = 2 min (mm) |
|---|---|---|---|
| M2 (0.1) | C2 | 0.1 | 255 |
| M5 (0.1) | C5 | 0.1 | 275 |
| M5 (0.07) | C5 | 0.07 | 255 |
| M6 (0.14) | C6 | 0.14 (0.07% of AM) | 265 |

Fluidizing composition C5 of the present invention has been tested with the same incorporation rate to mortar as reference fluidizing composition C2, i.e. 0.1% of active material (AM). It can be observed that the spreading value obtained for fluid plaster M5 (0.1) comprising fluidizing composition C5 of the present invention is higher than the one obtained for fluid plaster of the prior art (M2 (0.1)).

Moreover the same spreading performance is obtained for fluid plaster of the prior art M2 (0.1) with 0.1% of AM (PCE) as for fluid plaster of the present invention M5 (0.07) with 30% by weight less AM than plaster of the prior art. Such an observation can also be made for plaster formulation M6 (0.14) comprising 0.14% of fluidizing composition C6 obtained through deposition onto a substrate according to the present invention. A rate 0.14% i.e. 0.07% of AM as compared to total formula enables to obtain the same spreading performance as plaster formulation of the prior art based on reference fluidizing composition C2 rated 0.1%.

The fluidizing compositions according to the present invention as a consequence provide to the self-leveling mortar formulations of the present invention self-spreading values higher than those obtained with a polycarboxylate ether according to the prior art.

The fluidizing compositions according to the present invention obtained with both drying methods also make it possible to reduce the incorporated amounts while preserving a self-leveling mortars fluidity level comparable to that obtained with a polycarboxylate ether according to the prior art.

2. Fluidization Kinetics: Method 1 (FIGS. 2 and 3)

Figure 2:
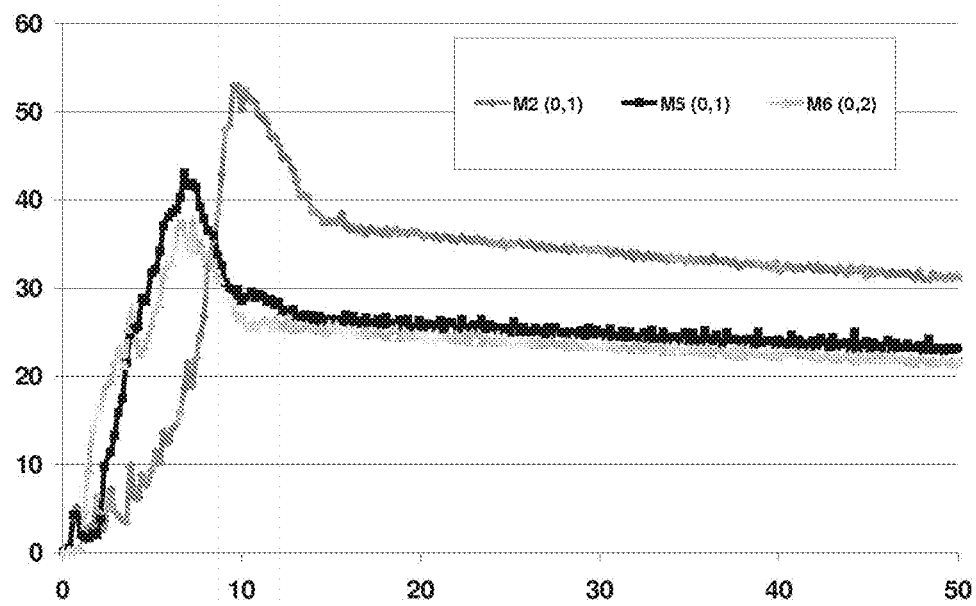
FIG. 2 illustrates, for the various mortar compositions, the strain evolution of the (in arbitrary unit) as a function of time (in seconds)
Figure 3:
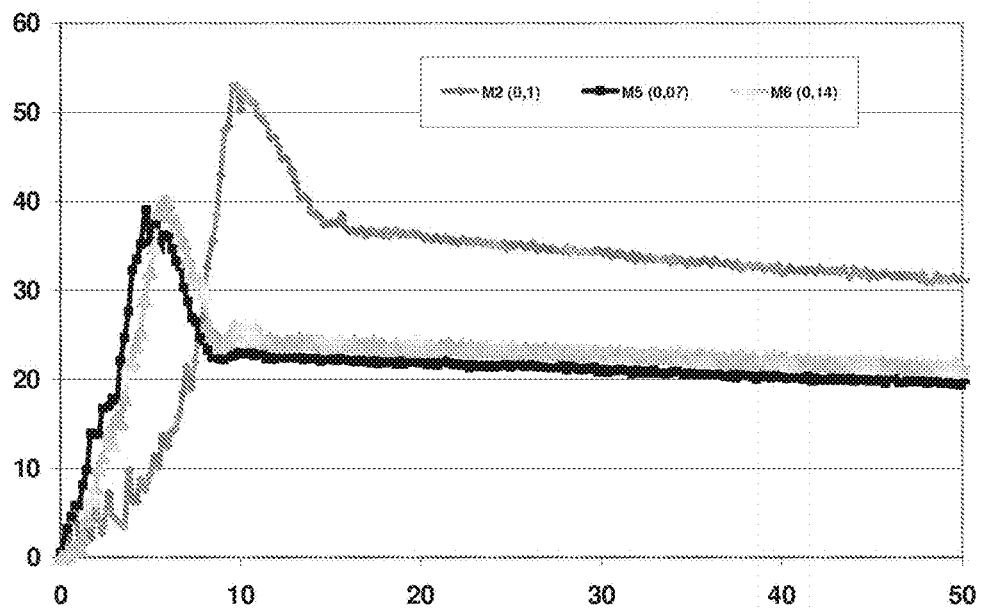
FIG. 3 illustrates, for the various mortar compositions, the strain evolution of the (in arbitrary unit) as a function of time (in seconds)

FIGS. 2 and 3 illustrate, for the various mortar compositions, the strain evolution of the (in arbitrary unit) as a function of time (in seconds).

FIG. 2 compares mortars containing fluidizing compositions C2, C5 and C6, for a rate of 0.1% of active material (thus 0.2% of C6).

It can be observed that mortars of the invention M5 and M6 at the very beginning of mixing have strain peaks of lower amplitude than the control mortar M2, the optimum being also achieved with shorter times. The mortars of the invention thus disperse more easily and more quickly. Therefore they will require less energy for being mixed and pumped. Their viscosity does stabilize within around 10 seconds, compared to 15 seconds for the control mortar. This means that a plaster according to the present invention will achieve its target fluidity within a time that is about 30% shorter than required for a plaster formulated with a fluidizing composition according to the prior art.

FIG. 3 compares mortars containing the fluidizing compositions C5 and C6, for a rate of 0.07% of active material, and the control mortar containing fluidizing composition C2, for a rate of active material of 0.1%. The decreased rate of fluidizing composition, according to the present invention, did not altered the dispersion kinetics.

This result confirms that the fluidizing composition of the invention can be used in lower amounts compared to a polycarboxylate ether according to the prior art.

3. Fluidization Kinetics: Method 2 (FIG. 4)

Figure 4:
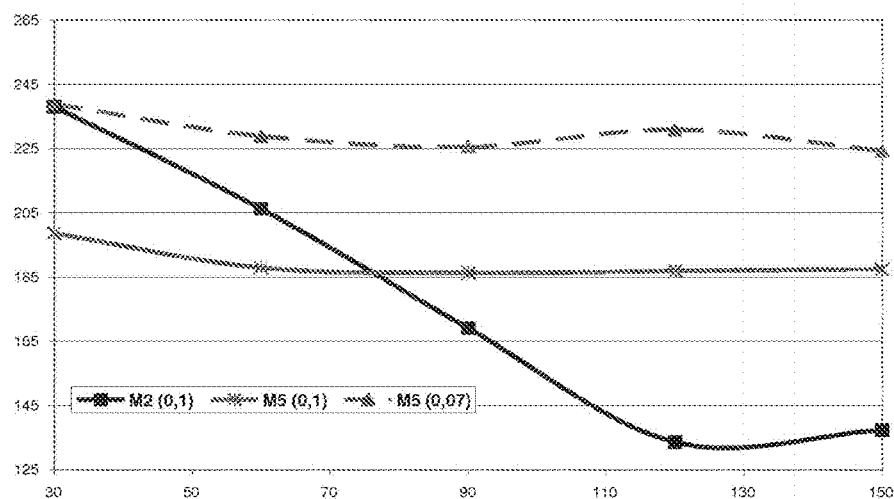
FIG. 4 illustrates the evolution of the shear stress at $100 s^{-1}$, for various mixing times (in seconds) of the dry mortar together with water.

FIG. 4 illustrates the evolution of the shear stress at 100 $s^{-1}$, for various mixing times (in seconds) of the dry mortar together with water.

Mortar M5, formulated with the fluidizing composition according to the present invention, develops a very stable shear stress, already from 30 seconds mixing. Such stability with very short mixing times (30 seconds) can be observed whatever the fluidizing composition C5 rate (0.1% and 0.07%).

On the contrary, it could be observed that the stress generated by the control mortar M2 according to the prior art only stabilizes with longer mixing times, of about 120 seconds.

The achievement of a strain stability from 30 seconds mixing for M5 as compared to 120 seconds for M2 reveals a better fluidization kinetics provided by fluidizing composition C5 according to the present invention.

P-Toluene Sulfonic Acid (PTSA) thus enables to improve the fluidization kinetics of polycarboxylate ether.

4. PTSA Intrinsic Effect on the Fluidization of Plaster Formulation

The possible effect of a PTSA addition only has been evaluated by measuring the rheological profile of three self-leveling mortar formulations:

"M5 (0.1)" formulated with 0.1% of fluidizing composition C5,

"M8 (0)" to which no additive has been added (0% PTSA and 0% PCE),

"M7 (0.1)" formulated with 0.1% PTSA monohydrate (with no PCE).

These formulations have been mixed together with a water nominal rate of 24 parts by weight as compared to the dry mortar formulation weight. A waiting time of 4 minutes is observed prior to placing the thus obtained mix in a rheometer Rheomat RM 260 fitted with a mobile part MK DIN 145.

A pre-shearing with velocity gradient 50 s−1 is carried out so as to stabilize the mix before the measurements which are then more reproducible.

Thereafter, a gradient-base exploration is carried out with the shear rate increments given in the Table hereunder:

TABLE V

| | Gradient $s^{-1}$ | | | | | | | | | |
|---|---|---|---|---|---|---|---|---|---|---|
| | 0.1 | 0.2 | 0.5 | 1 | 2 | 5 | 10 | 20 | 50 | 100 | 200 |
| Measurement time (seconds) | 20 | 20 | 20 | 10 | 10 | 10 | 10 | 10 | 10 | 5 | 5 |

Curves showing the viscosity variations (Pa·s) as a function of the shear gradient ($s^{-1}$) are given on FIG. 5.

Plaster M7 (0.1) formulated only with PTSA instead of the fluidizing composition has the same rheological profile as plaster M8 (0) containing neither a fluidizing composition nor PTSA. On the contrary, plaster M5 (0.1), obtained according to the present invention, has a lower viscosity than the other two plasters tested.

This demonstrates that PTSA alone does not provide to the mortar any fluidizing effect. Its association to polycarboxylate ether exclusively enables to increase the fluidization kinetics, as compared to polycarboxylate ether alone.

Although the present invention has been described in relation with a particular embodiment, it should be understood that in no way it is limited thereto, and that it includes all the technical equivalents of the described means, as well as combinations thereof, provided these are within the scope of the present invention.

The invention claimed is:

1. A fluidizing composition comprising:
at least one superplasticizer chosen from polycarboxylate ether polymers, which comprises from 1 to 20 parts by weight, of at least one aromatic hydrocarbon sulfonic acid or at least one salt of said at least one aromatic hydrocarbon sulfonic acid chosen from alkali salts, alkaline-earth salts or one of their mixtures, for 100 parts by weight of superplasticizer, said superplasticizer representing at least 40%, by weight, relative to the dry fluidizing composition total weight.

2. The fluidizing composition according to claim 1, wherein the polycarboxylate ethers are chosen from copolymers of carboxylic acids and poly(alkylene glycol) carboxylic ester, copolymers of carboxylic acids and poly(alkylene glycol) amide, copolymers of carboxylic acids and poly(alkylene glycol) imide, copolymers of carboxylic acids and poly(alkylene glycol) vinyl ethers, copolymers of carboxylic acids and poly(alkylene glycol) (meth)allyl ethers, copolymers of carboxylic acids and poly(alkylene glycol) isoprenol ethers, neutralized or not, or one of their mixtures.

3. The fluidizing composition according to claim 2, wherein the aromatic hydrocarbon sulfonic acid is chosen from benzenesulfonic acid, p-phenolsulfonic acid, cresolsulfonic acid, o-cresolsulfonic acid, m-cresolsulfonic acid, para-toluenesulfonic acid, 2,4-xylenesulfonic acid, 2,5-xylenesulfonic acid, dodecyl-benzenesulfonic acid, alkyldiphenyloxide disulfonic acids and salts thereof, from sodium and potassium salts, or one of their mixtures.

4. The fluidizing composition according to claim 2, comprising at least 80% by weight of a superplasticizer as compared to the fluidizing composition dry total weight.

5. The fluidizing composition according to claim 2, comprising at least 90% by weight of a superplasticizer as compared to the fluidizing composition dry total weight.

6. The fluidizing composition according to claim 1, wherein the aromatic hydrocarbon sulfonic acid is chosen from benzenesulfonic acid, p-phenolsulfonic acid, cresolsulfonic acid, o-cresolsulfonic acid, m-cresolsulfonic acid, para-toluenesulfonic acid, 2,4-xylenesulfonic acid, 2,5-xylenesulfonic acid, dodecyl-benzenesulfonic acid, alkyldiphenyloxide disulfonic acids and salts thereof, from sodium and potassium salts, or one of their mixtures.

7. The fluidizing composition according to claim 1, comprising at least at least 80% by weight of a superplasticizer as compared to the fluidizing composition dry total weight.

8. The fluidizing composition according to claim 1, comprising at least 90% by weight of a superplasticizer as compared to the fluidizing composition dry total weight.

9. A method for preparing a fluidizing composition according to claim 1, in a liquid form or in the form of a powder, comprising:

a step for mixing together at least one polycarboxylate ether and at least one aromatic hydrocarbon sulfonic acid or at least one salt of said at least one aromatic hydrocarbon sulfonic acid.

10. The method for preparing a fluidizing composition in the form of a liquid according to claim 9, comprising a step for mixing said polycarboxylate ether and said aromatic hydrocarbon sulfonic acid or at least one salt of said at least one aromatic hydrocarbon sulfonic acid in solution in a solvent.

11. The method for preparing a fluidizing composition in the form of a powder according to claim 9, comprising a step for mixing a powder of said polycarboxylate ether and a powder of said aromatic hydrocarbon sulfonic acid or at least one salt of said at least one aromatic hydrocarbon sulfonic acid.

12. The method for preparing a fluidizing composition in the form of a powder according to claim 9, which comprises:
a step for mixing the polycarboxylate ether and the aromatic hydrocarbon sulfonic acid or at least one salt of said at least one aromatic hydrocarbon sulfonic acid in solution in a solvent, and
a drying step to obtain a composition in the form of a powder.

13. A dry mortar comprising at least one hydraulic binder, wherein the mortar comprises the fluidizing composition according to claim 1.

14. The dry mortar according to claim 13, which comprises, by weight as compared to the dry mortar total weight:
from 15 to 50% of hydraulic binder,
from 25 to 80% of mineral fillers having a particle size distribution ranging from 0 to 2 mm,
from 0.01 to 2% of the fluidizing composition,
from 0 to 5% of additives.

15. The dry mortar according to claim 13, wherein the hydraulic binder comprises at least one high-alumina cement and/or one Portland cement and/or one or more calcium sulfates.

16. A self-leveling fluid mortar obtained through mixing together with water the dry mortar according to claim 13, which has at the mixing time with water, a water/dry mortar weight ratio lower than or equal to 0.5.

17. A method for preparing and coating the self-leveling fluid mortar of claim 16, whichcomprises:
a) preparing the fluid mortar by mixing together the dry mortar with water;
b) optionally, pumping the fluid mortar; and
c) applying the fluid mortar onto a surface,
wherein the coating makes even said surface onto which it is applied.

18. A concrete comprising at least one hydraulic binder, water, and at least one aggregate selected from the group consisting of gravels and broken gravels, wherein the concrete comprises the fluidizing composition according to claim 1.

19. A method of forming a composition comprising adding the fluidizing composition according to claim 1 as a superplasticizer to a composition comprising at least one hydraulic binder.

20. The fluidizing composition according to claim 1, wherein the fluidizing composition is a powder with a particle size less than or equal to 315 μm.

* * * * *